(12) United States Patent
Grochowicz et al.

(10) Patent No.: US 9,100,394 B2
(45) Date of Patent: Aug. 4, 2015

(54) METHOD AND SYSTEM FOR CONTENT SUBMISSION

(71) Applicant: Bazaarvoice, Inc., Austin, TX (US)

(72) Inventors: Tom Grochowicz, Austin, TX (US); Adam McElwee, Austin, TX (US); Jeff Rego, Austin, TX (US)

(73) Assignee: Bazaarvoice, Inc., Austin, TX (US)

( * ) Notice: Subject to any disclaimer, the term of this patent is extended or adjusted under 35 U.S.C. 154(b) by 337 days.

(21) Appl. No.: 13/649,371

(22) Filed: Oct. 11, 2012

(65) Prior Publication Data
US 2014/0108559 A1   Apr. 17, 2014

(51) Int. Cl.
| G06F 15/16 | (2006.01) |
| --- | --- |
| H04L 29/06 | (2006.01) |
| H04M 3/42 | (2006.01) |
| H04N 21/462 | (2011.01) |
| G06F 17/20 | (2006.01) |
| G06Q 30/06 | (2012.01) |
| G06Q 30/02 | (2012.01) |
| G06F 17/24 | (2006.01) |

(Continued)

(52) U.S. Cl.
CPC ............ *H04L 63/0853* (2013.01); *G06F 15/16* (2013.01); *G06F 17/20* (2013.01); *H04M 3/42263* (2013.01); *H04N 21/4622* (2013.01); *G06F 17/241* (2013.01); *G06F 17/30879* (2013.01); *G06Q 20/3276* (2013.01); *G06Q 30/02* (2013.01); *G06Q 30/0203* (2013.01); *G06Q 30/0282* (2013.01); *G06Q 30/0631* (2013.01)

(58) Field of Classification Search
CPC ........... H04L 63/0853; H04M 3/42263; G06F 15/16; G06F 17/241; G06F 17/30879; H04N 21/4622; G06Q 30/0631; G06Q 30/0282; G06Q 30/0203; G06Q 20/3276
USPC ......... 709/203, 204, 205, 206, 217, 219, 227, 709/216; 705/7.32, 26.7, 347; 235/462.01, 235/462.09
See application file for complete search history.

(56) References Cited

U.S. PATENT DOCUMENTS

| 8,681,954 B1* | 3/2014 | Shires et al. ................ 379/93.21 |
| --- | --- | --- |
| 2005/0234943 A1 | 10/2005 | Clarke |
| 2006/0047844 A1* | 3/2006 | Deng ............................ 709/231 |

(Continued)

OTHER PUBLICATIONS

International Search Report and Written Opinion in Application No. PCT/US2013/064213 dated Jan. 29, 2014, 12 pages.

*Primary Examiner* — Liangche A Wang
*Assistant Examiner* — Johnny Aguiar
(74) *Attorney, Agent, or Firm* — Meyertons, Hood, Kivlin, Kowert & Goetzel, P.C.

(57) ABSTRACT

Embodiments of systems and methods for linking a computer device to a session that is being conducted on another computing device are disclosed. A content-generation session may be conducted by a user on a particular computing device. As part of the content-generation session, the user may request to add other content, which may be located on a different computing device, to content being authored during the content-generation session. Information to allow the different computing device to establish a link to the content-generation session may be generated. Using that information, a link may be automatically established between the different computing device and the content-generation session, such that the other content residing on the different computing device can be associated with the content-generation session.

17 Claims, 11 Drawing Sheets

(51) Int. Cl.
  *G06Q 20/32* (2012.01)
  *G06F 17/30* (2006.01)

(56) References Cited

U.S. PATENT DOCUMENTS

| | | | |
|---|---|---|---|
| 2006/0258375 A1* | 11/2006 | Wilbrink et al. | 455/456.3 |
| 2010/0070889 A1 | 3/2010 | Weisbart et al. | |
| 2010/0125625 A1* | 5/2010 | Oliver et al. | 709/203 |
| 2011/0219427 A1 | 9/2011 | Hito et al. | |
| 2012/0023167 A1 | 1/2012 | Hovdal et al. | |
| 2012/0150871 A1 | 6/2012 | Hua et al. | |
| 2012/0198531 A1* | 8/2012 | Ort et al. | 726/7 |
| 2012/0260298 A1* | 10/2012 | Chen et al. | 725/114 |
| 2012/0324002 A1* | 12/2012 | Chen | 709/204 |
| 2013/0013699 A1* | 1/2013 | Huxley | 709/206 |
| 2013/0066964 A1* | 3/2013 | Odio et al. | 709/204 |
| 2013/0124508 A1* | 5/2013 | Paris et al. | 707/723 |

* cited by examiner

METHOD AND SYSTEM FOR CONTENT SUBMISSION

TECHNICAL FIELD

This disclosure relates generally to the submission of content. In particular, this disclosure relates to the association of submitted content with a session. Even more specifically, this disclosure relates to the automatic association of content submitted from a particular computing device (for example, a mobile device) with a session being conducted on a different computing device.

BACKGROUND

The increasing use of multiple computing devices by users has given rise to a situation in which a user may wish to associate content generated on one computing device with content generated using another computing device. The association of such content, however, may involve the physical coupling of the computing devices, navigation through a file system, or other barriers that serve to dissuade the user. Such barriers may impact the quality of content generated by a user or, in certain cases, may frustrate the user enough to curtail the generation of content altogether. In addition to contributing to a user's frustration, others who utilize or consume such user generated content may also be impacted. Thus, it is desired to allow content to be more easily associated.

BRIEF DESCRIPTION OF THE DRAWINGS

The drawings accompanying and forming part of this specification are included to depict certain aspects of embodiments of the present disclosure. A clearer impression of the methods and systems for content association will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
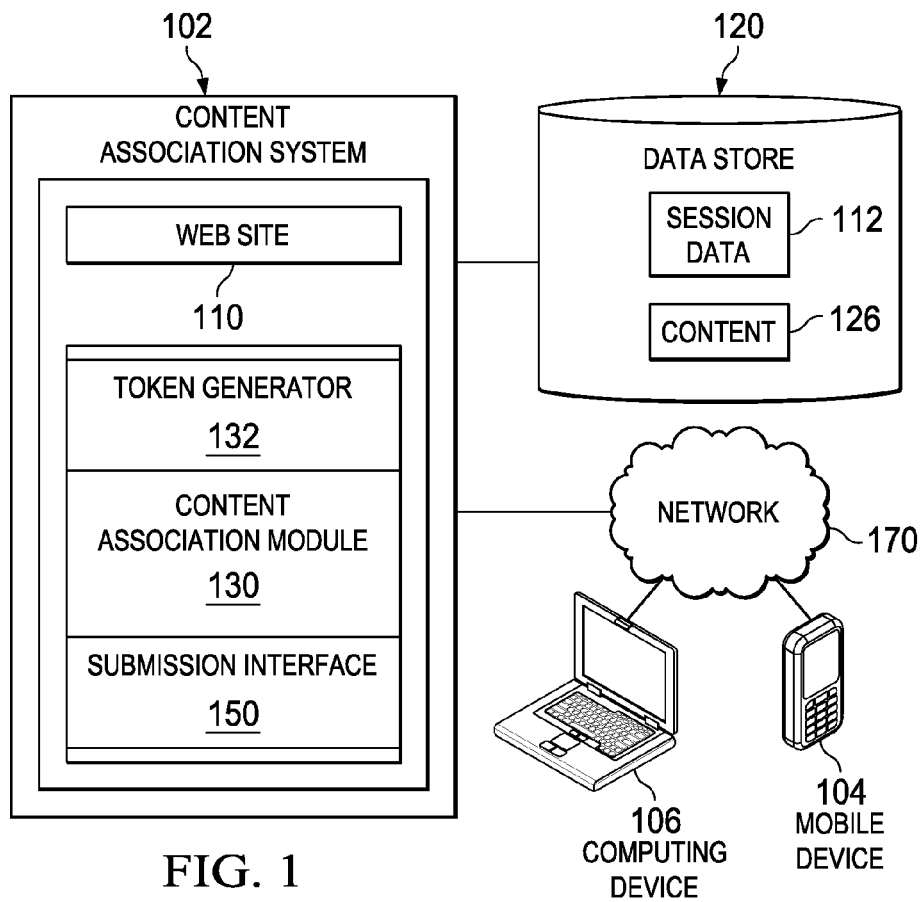
FIG. 1 is a block diagram of a topology implemented using one embodiment of a content association system.

The present content association systems and methods, and the various features and advantageous details thereof, are explained more fully with reference to the nonlimiting embodiments that are illustrated in the accompanying drawings and detailed in the following description. Descriptions of well-known starting materials, processing techniques, components and equipment are omitted so as not to unnecessarily obscure the description. It should be understood, however, that the detailed description and the specific examples, while indicating preferred embodiments of the present disclosure, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented as suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments can be implemented in one or more computers communicatively coupled to a network (for example, the Internet) and/or in one or more standalone computers. As is known to those skilled in the art, an exemplary computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like. In various embodiments, the computer has access to at least one database over the network.

ROM, RAM, and HD are computer memories for storing computer-executable instructions executable by the computer system (e.g., using the CPU) or capable of being compiled or interpreted to be executable by the computer system. Within this disclosure, the term "computer readable medium" or is not limited to ROM, RAM, and HD and can include any type of data storage medium that can be read by a computer system. For example, a computer-readable medium may refer to a data cartridge, a data backup magnetic tape, a floppy diskette, a flash memory drive, an optical data storage drive (e.g., CD, DVD), memory (e.g., ROM, RAM), HD, or other suitable storage device or (collection of storage devices). The processes described herein may be implemented by a computer system performing operations in response to execution of computer-executable instructions that may reside (e.g., stored as software code) on a computer readable medium.

In one exemplary embodiment, the computer-executable instructions may include instructions in one or more programming or scripting languages, such as C++, Java, JavaScript, HTML, or any other programming or scripting language. Various software/hardware/network architectures may be used. For example, various features of the embodiments may be implemented on one computer or shared among two or more computers. In one embodiment, various aspects may be distributed in the network. Communications between computers implementing particular embodiments of the present disclosure can be accomplished using any electronic, optical, or radio frequency signal, or other suitable methods and tools of communication in compliance with known network protocols.

It will be noted that the term "computer system" has its ordinary and accepted meaning in the art, and includes one or more computing devices operating together and any instructions stored thereon. A computing device may include one or more processor units and a memory subsystem including a computer readable medium. A memory subsystem may store program instructions executable using the one or more processor units. The term "server" also has its ordinary and accepted meaning in the art, which includes one or more computer systems that are configured to handle requests from client computer systems—e.g., for services, data (including files, web pages, etc.), and so on.

As used herein, the term "configured to" means that a particular piece of hardware, or computer instructions, or some combination, are arranged to perform a particular task or tasks when operated. Thus, a computer system that is "configured to" perform task "A" means that the computer system includes a circuit, program instructions stored in memory, or other structure that, during operation of a computer system, performs or can be used to perform task A. As such, a computer system can be "configured to" perform task A even if the computer system is not currently on. Similarly, computer executable instructions or a computer readable medium that is "configured to" perform task B includes instructions, that if executed by a computer system, perform task B. A "module" may be hardware, instructions, or other structure, or some combination that is configured to perform a particular task.

Before discussing specific embodiments, a brief overview of the context of the disclosure may be helpful. As discussed above, the increasing use of multiple computing devices by users has given rise to situations in which a user may wish to associate content generated on one computing device with content generated using another computing device. The association of such content, however, may involve the physical coupling of the computing devices, navigation through a file system, or other barriers that serve to dissuade the user. Not only are these barriers burdensome for the user, but in some cases they may actually prevent the user from associating such content, and thus may impact the quality of content being generated by the user.

These difficulties may be illustrated in more detail using the context of user generated content. Many operators of web sites including, for example merchants ("merchants" as used herein refers to any entity involved in the production, marketing, or selling of a product or service via, for example, online and/or "brick and mortar" channels) report that products that are presented (e.g., through marketing or sales materials) with more user generated content experience better sales, and are returned less often than similar products that are presented with less user generated content. This user generated content may include data such as user reviews, user stories, ratings, comments, descriptions of problems and issues, questions/answers, or other types of content which, for example, a user may be allowed to compose or submit through online or other methods.

User generated content may increase the overall information that is available to a potential buyer of a product. Thus, user generated content may improve sales of the product by increasing online and/or in-store consumers' awareness of the product.

As can be seen, then, the generation, distribution and use of user generated content is increasingly important in the modern marketplace. Accordingly, embodiments of system and methods for the distribution of user generated content have been developed. Certain of these embodiments may be better understood with reference to U.S. patent application Ser. No. 12/243,679 entitled "METHOD AND SYSTEM FOR DISTRIBUTION OF USER GENERATED CONTENT" by inventors Bockius et al. filed Oct. 1, 2008; U.S. patent application Ser. No. 12/614,016 entitled "METHOD AND SYSTEM FOR PROMOTING USER GENERATION OF CONTENT" by inventors Chen et al. filed Nov. 6, 2009, now U.S. Pat. No. 8,214,261 issued Jul. 3, 2012; U.S. patent application Ser. No. 12/698,447 entitled "METHOD AND SYSTEM FOR PROVIDING CONTENT GENERATION CAPABILITIES" by inventors Chen et al., filed Feb. 2, 2010; U.S. patent application Ser. No. 13/289,586 entitled "METHOD AND SYSTEM FOR DISTRIBUTION OF CONTENT" by inventors DeHaven et al., filed Nov. 4, 2011; U.S. patent application Ser. No. 13/289,724 entitled "METHOD AND SYSTEM FOR DISTRIBUTION OF CONTENT USING A SYNDICATION DELAY" by inventors DeHaven et al., filed Nov. 4, 2011; U.S. patent application Ser. No. 12/698,510, entitled "METHOD AND SYSTEM FOR PROVIDING PERFORMANCE METRICS" by inventors Chen et al. filed Feb. 2, 2010; and U.S. patent application Ser. No. 13/362,161, entitled "Method and System for Pagination of Content" by inventors DeHaven et al. filed Jan. 3, 2012, which are all fully incorporated herein by reference.

Users may thus generate content during a session using a content generation tool (e.g., presented on a web site that is accessed by the user via a computing device) that may provide the user with the option to submit associated content. For example, a user may use a laptop computer to access a merchant's web site to write a review. The merchant's web site may provide a content generation tool that facilitates authoring (e.g., original composition and/or editing) of user generated content (e.g., review text authored by the user). The content generation tool may present the user with the option to submit additional content (e.g., images, videos, audio) to associate with the review. In many cases, however, the additional content that the user wishes to submit may reside on a different computing device. For example, suppose that a user wishes to submit a photo to append to the review that is being authored using the laptop computer. However, the photo may reside on a different device (e.g., smart phone, other mobile device), and not on the laptop computer that is being used to author the review. Thus, in order to submit the additional content, some conventional systems may require physically coupling the different device to the laptop computer, transferring the additional content from the different device to the laptop computer, and navigating the file system of the laptop computer to select the additional content to be submitted. In other conventional systems, the user may be required to transfer the additional content via a separate messaging application (e.g., an email application), and to subsequently navigate the messaging application and the laptop computer's file system to select the content to be submitted. As may be imagined, these requirements may present certain impediments to efficient inclusion of this content by a user.

The inclusion of such additional content may, however, be important not just to the user but also to the operators of the web site, such as a merchant. For example, more-detailed and useful user generated content that may be produced by including of the additional content may provide more meaningful and/or more attention-getting product-related information, thereby possibly driving improved sales of that product.

Various embodiments of the present disclosure include techniques for linking a first computing device to a session that is being conducted on a second computing device, such that content residing on the first computing device can be associated with the session without requiring that the content first be transferred the second computing device.

For example, in certain embodiments a user may be authoring content (e.g., composing and/or editing user generated content such as a product review, information expressing a user's status or opinion, or other information relating to a user or to a thing of interest to a user) during a session being conducted on a first computing device. During the session, the user may request to add additional content (e.g., images, videos, audio data) to the user generated content that is being authored. Information to allow a second computing device (on which the additional content resides) to establish a link to the session may be generated. Using the generated linking information, a link may be automatically established between the second computing device and the session, such that the additional content that the user wishes to add can be associated with the session (e.g., without requiring the additional content to be transferred from the second computing device to the first computing device).

To illustrate a specific example, consider that a user may be using a laptop computer to access a merchant's web site. The user may be authoring content at that web site during a content-generation session. During the content-generation session, the user may wish to add particular content, such as an image, that resides on a mobile device such as a smartphone or camera. The user may use the web site to request the addition of the particular content to the authored content. When the server providing the web site receives such a request, the server may generate linking information that is configured to cause the mobile device to establish a link to the content-generation session. Using this linking information (e.g., by reading the linking information with the mobile device), a link between the mobile device and the content-generation session may be automatically established to facilitate transfer of the particular content from the mobile device to a server (e.g., the merchant's content server or a different server) to be associated with the content-generation session. The particular content can then, for example, be displayed to the user through the web site to enable the user to perform subsequent actions with the particular content. For example, possible subsequent actions may include adding the particular content to other content being authored in the content-generation session, presenting an interface to allow a user to verify acceptance of the particular content, and presenting an interface to allow the user to format or otherwise edit the particular content (e.g., cropping or otherwise editing a picture).

The generated linking information may take a variety of formats according to different embodiments. For example, in one embodiment, server-generated linking information may comprise information that is sent to a first device (e.g., a client-side computing device used during the content-generation session) to be utilized by the first device to generate an optical data representation (e.g., bar code or QR code). Similarly, in some embodiments, server-generated generated linking information may include the optical data representation itself, which may subsequently be conveyed to the first device for display. In some embodiments, an optical data representation may be printed.

The optical data representation may be configured to be read (e.g., scanned from the display of the first computing device, scanned from a printed copy) by a second computing device (e.g., a mobile device), such that responsive to the optical data representation being read by the second computing device, a link may subsequently be automatically (e.g., without requiring further user input) established between the second computing device and the content-generation session. Using this link, the particular content residing on the mobile device may be sent from the second computing device to be associated with the content-generation session (e.g., sent to the merchant's content server, sent to a different server).

In another embodiment, linking information may be provided to the second computing device via a message that includes a reference such as a Universal Resource Identifier (URI) (e.g., Universal Resource Locator (URL), hyperlink). Such a message may be sent to the second computing device (e.g., via email, as part of a text message), and may be selectable using the second computing device to cause the second computing device to automatically (e.g., without requiring further user input) establish a link between the second computing device and the content-generation session whereby the particular content may be transmitted from the second computing device to be associated with the content-generation session (e.g., sent to the merchant's content server, sent to a different server).

In contrast to conventional techniques, then, embodiments as disclosed herein may facilitate a second computing device, such as a mobile device, to automatically establish a link to a content generation session, thereby providing a simple and efficient way to upload and associate content with a content generation session that is associated with a first computing device (e.g., a client-side computing device such as a desktop or notebook computer) that is different from the second computing device.

It should be noted initially before proceeding further that while certain embodiments presented herein are described in conjunction with the association of certain types of content residing on a mobile device with a content-generation session associated with another computing device, these descriptions and embodiments should not be taken as limiting the scope of other embodiments. For example, other embodiments may be usefully applied to the association of almost any type of content that resides on almost any type of first device with a content-generation session being conducted with a second device that is different from the first device, for almost any purpose desired.

Turning now to FIG. 1, one embodiment of a topology that includes a content association system is depicted. Topology 100 includes a content association system 102 coupled to mobile device 104 and to computing device 106 over network 170. Network 170 may include wired or wireless networks such as the Internet, an intranet, a local-area network (LAN), a wide-area network (WAN), a cellular network, a publicly switched telephone network (PSTN), or another type of network. It will be understood that network 170 may be a combination of multiple different kinds of wired or wireless networks.

Content association system 102 may include web site module 110, which may be configured to provide a web site (or portion thereof) that is accessible over network 170. Web site module 110 may also be configured to establish a session with computing device 106 in response to computing device 106 accessing a web page (or portion thereof, collectively referred to herein as a "web page") provided by web site module 110. Web site module 110 may also store session data 112, including an identifier for the established session, in data store 120.

In one embodiment, such a session may be established using full-duplex single socket communication techniques, such as those implemented in accordance with the WebSocket specification. Various embodiments may employ other bi-directional communication techniques, such as those provided by Python, Ruby, Java, code libraries such as socket.io or node.js, Asynchronous JavaScript and XML (AJAX), or long polling techniques.

A web page provided by web site module 110 may provide a content generation tool to allow a user to author and/or edit content, including textual content, via a content-generation session. Such a content generation tool may provide an interface that is selectable by a user to associate content from another device with the content being authored (composed and/or edited) using the content generation tool.

Content association module 130 may include submission interface module 150 that is configured to receive a request to associate additional content with a session, and in response to generate linking information. This linking information may include a token generated by token generator 132. Token generator 132 may be configured to generate a token that may be used to associate the additional content with the session. The generated token may be included in session data 112, which may be stored in data store 120. This token may be, for example, a universally unique identifier (UUID) that may in some cases be generated based on information such as a Media Access Control (MAC) address.

Submission interface module 150 may also be configured to generate information configured to cause the mobile device 104 to access a submission interface. In one embodiment, this generated information may comprise the token itself, and in such embodiments the submission interface module 150 may be configured to send the generated token to the computing device 106.

In such embodiments, the web page provided by web site module 110 may be configured to provide a URI that is generated based on the received token, where the URI may be associated with submission interface module 150. An optical data representation encoding the generated URI may be displayed through the web page. The generation of the optical data representation may comprise, for example, providing the URI to a Quick Response (QR) code generator to produce a corresponding QR code. By reading such a QR code (e.g., using a QR code reader on the mobile device 104 to scan a depiction of the QR code presented on a web page) a web browser on the mobile device 104 may be directed to the resource (e.g., web page, electronic document, service) associated with the generated URI.

In another embodiment, the information generated by the submission interface module 150 may comprise a URI containing the generated token. In some embodiments, submission interface module 150 may be configured to send the URI to the mobile device 104 using a message (e.g. e-mail, text message). The message may be configured such that by selecting the URI (e.g., by clicking on the URI, by otherwise providing the URI to the web browser on the mobile device 104), a web browser on the mobile device 104 may be directed to the resource associated with the URI.

In yet another embodiment, the information generated by the submission interface module 150 may comprise a URI containing the generated token that may then be sent for display to the user via the web page on the computing device 106. In such embodiments, the displayed URI may be shortened (for example using a URL shortener or the like).

Submission interface module 150 may also be configured to provide a user interface that is accessible by a particular device (e.g., a mobile device) in response to selection of the URI (e.g., by a user of the mobile device). Such a user interface may be configured to allow content to be accessed from storage on the particular device for upload to the submission interface module 150.

In some embodiments, uploaded content (content 126) received by submission interface module 150 can be stored at data store 120 (e.g., a data store associated with the token). Additionally, submission interface module 150 may be configured to link the uploaded content to a session. In one embodiment, submission interface module 150 may determine if there is a session associated with the token by accessing session data 112 in data store 120. If there is a session associated with the token, a number of actions may be taken. For example, some embodiments may send a message to the user (e.g., through a web page currently being accessed by a user at computing device 106) indicating a URI that is usable to access the uploaded content 126. In some embodiments, the uploaded content may be presented to the user through a web page at computing device 106 to provide options for further processing the uploaded content, including, for example, editing the uploaded content (e.g., cropping, resizing, otherwise editing an image) and incorporating the uploaded content into the user generated content that is being authored by the user during the content-generation session.

Authored content of the content-generation session at computing device 106 may be submitted to content association system 102 and subsequently stored as content 126 in the data store 120. If the user has indicated that the uploaded content (e.g., additional content submitted from the mobile device 104) should be included with the authored content, the authored content from content-generation session may be associated with the uploaded content (e.g. the resulting user generated content may include the authored content aggregated with the uploaded content, the resulting user generated content may include the authored content along with a reference to uploaded content). Accordingly, subsequent presentation of the resulting user generated content may include both the authored content (e.g., content generated by the user using the content generation tool in a content-generation session) and the additional content (e.g., content uploaded form the mobile device 104).

Figure 2A:
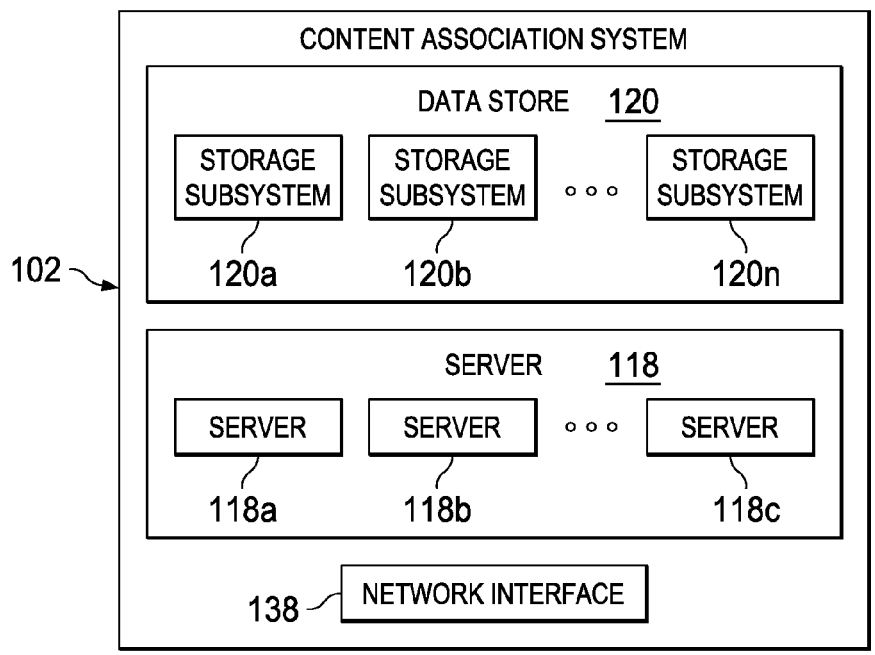
FIG. 2A is a block diagram of one embodiment of the content association system depicted in FIG. 1.

Turning now to FIG. 2A, a block diagram of one embodiment of content association system 102 is depicted. As shown, content association system 102 includes data store 120 and network interface 138 that are coupled to server 118. Server 118 may be one or more servers that are configured to singly or collectively provide functionality of content association system 102, or portions thereof. In some embodiments, network interface 138 may be part of a web server dedicated to processing network communications between computer systems and servers 118.

Figure 2B:
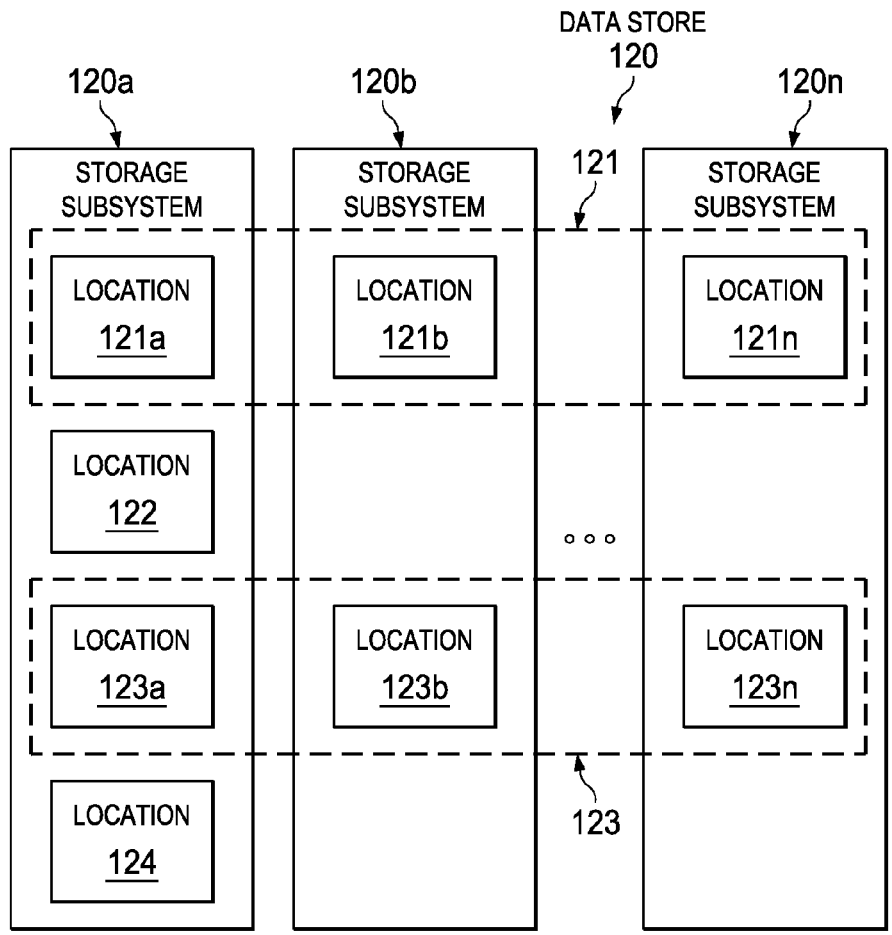
FIG. 2B is a block diagram of one embodiment of the data store depicted in FIG. 2A.

Data store 120 may in some embodiments include one or more storage subsystems. For example, data store 120 may include one or more disk drives coupled to one or more servers 118a, 118b, 118c. In other embodiments, data store 120 may include a plurality of storage systems configured as a storage area network, network attached storage, or any suitable storage subsystem configuration. In some embodiments, data store 120 may be remote from server 118. Data store 120 may in some cases be a virtual storage subsystem accessed, for example, though a cloud computing provider. Referring also to FIG. 2B, an embodiment of data store 120 that includes multiple storage subsystem 120 may store data in locations within a single storage subsystem (e.g., location 122 or location 124), or as data stored in a distributed manner (e.g., a distributed database) across several storage subsystems (e.g., location 121 or location 123).

Figure 2C:
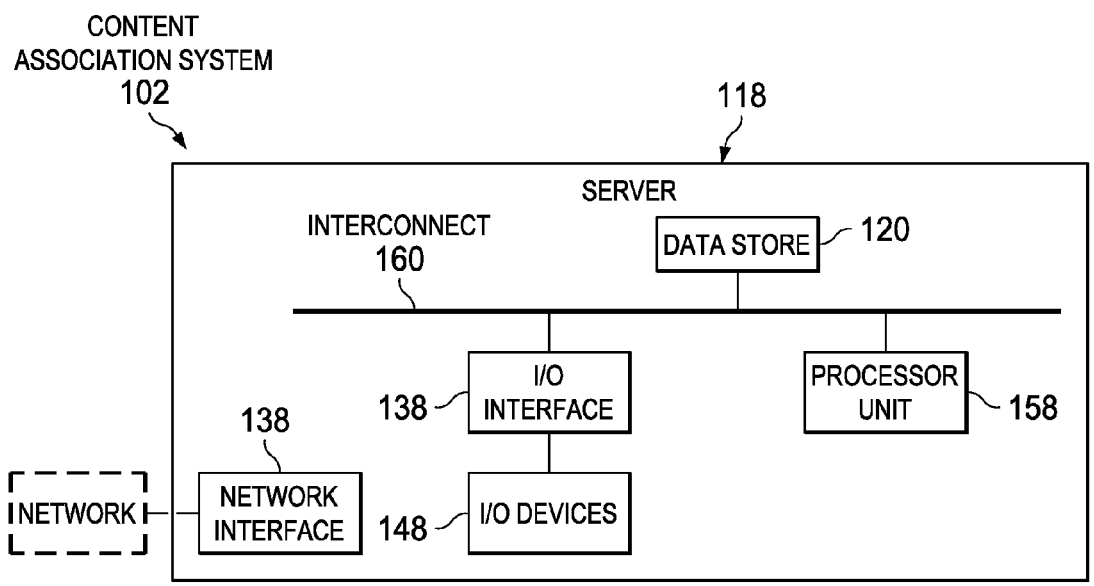
FIG. 2C is a block diagram of one embodiment of the server depicted in FIG. 2A.

Turning now to FIG. 2C, a block diagram of one embodiment of server 118 is depicted. Server 118 is representative of a plurality of servers in an embodiment of content association system 102, as well as a single system in an embodiment of content association system 102 that includes only one server. Content association system 102 may be any suitable type of device, including, but not limited to, a personal computer system, desktop computer, laptop or notebook computer, mainframe computer system, web server, workstation, or network computer. As shown, content association system 102 includes a processor unit 158, data store 120, input/output (I/O) interface 138 coupled via an interconnect 160 (e.g., a system bus). I/O interface 138 may be coupled to one or more I/O devices 148.

Processor unit 158 may include one or more processors. In some embodiments, processor unit 158 includes one or more coprocessor units. In some embodiments, multiple instances of processor unit 158 may be coupled to interconnect 160. Processor unit 158 (or each processor within 158) may contain a cache or other form of on-board memory. In general, content association system 102 is not limited to any particular type of processor unit or processor subsystem.

Data store 120 may be configured to store data that is usable by processor unit 158 (e.g., instructions executable by processor unit 158, data otherwise accessed by processor unit 158). Data store 120 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Data store 120 may consist solely of volatile memory in one embodiment. Data store 120 may store program instructions executable by server 118, using processor unit 158, to cause server 118 to implement the various techniques disclosed herein.

I/O interface 138 may represent one or more of various types of interfaces configured to facilitate communication with other devices, according to various embodiments. In one embodiment, I/O interface 138 may include a bridge chip coupling a front-side bus to one or more back-side buses. I/O interface 138 may be coupled to one or more I/O devices 148 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Moving now to FIGS. 3A-3H operation of one embodiment of content association system 102 is depicted. Again, while this embodiment will be described in conjunction with the association of certain types of content residing on an exemplary mobile device with a session in which certain types of content are being generated by a user at another computing device, these descriptions and embodiments should not be taken as limiting the scope of other embodiments.

Figure 3A:
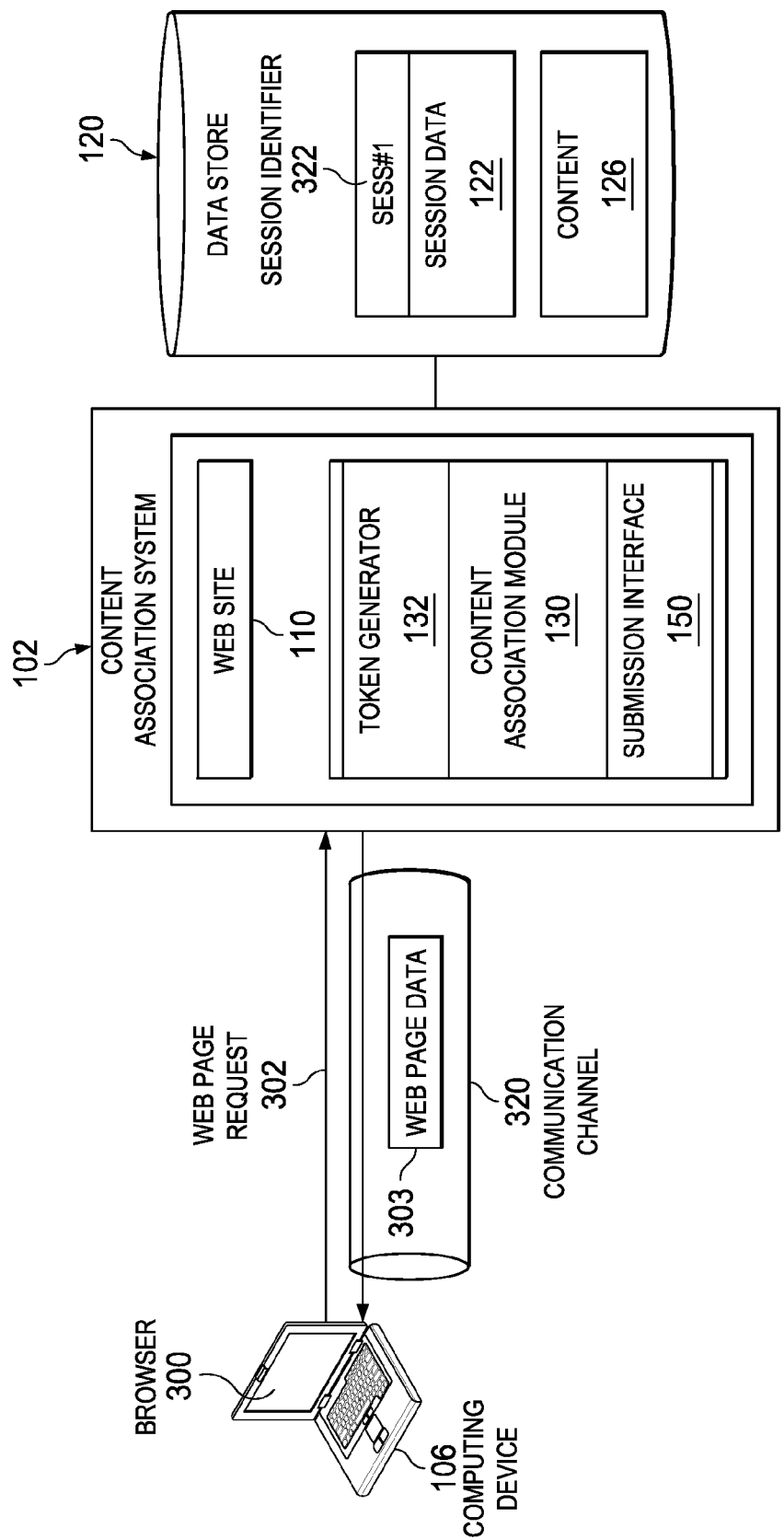
FIGS. 3A-3H are block diagrams depicting operation of various embodiments of the present content association system.

Initially then, referring to FIG. 3A, an application such as browser 300 at computing device 106 may be used to send a request 302 for a web page to web site module 110 of content association system 102. Web site module 110 may establish a session (e.g., by opening up communication channel 320) between web site module 110 and the browser 300, and may store a corresponding session identifier 322 in session data 122. Web site module 110 may also reply to the request 302 with the requested web page data 303.

Figure 3B:
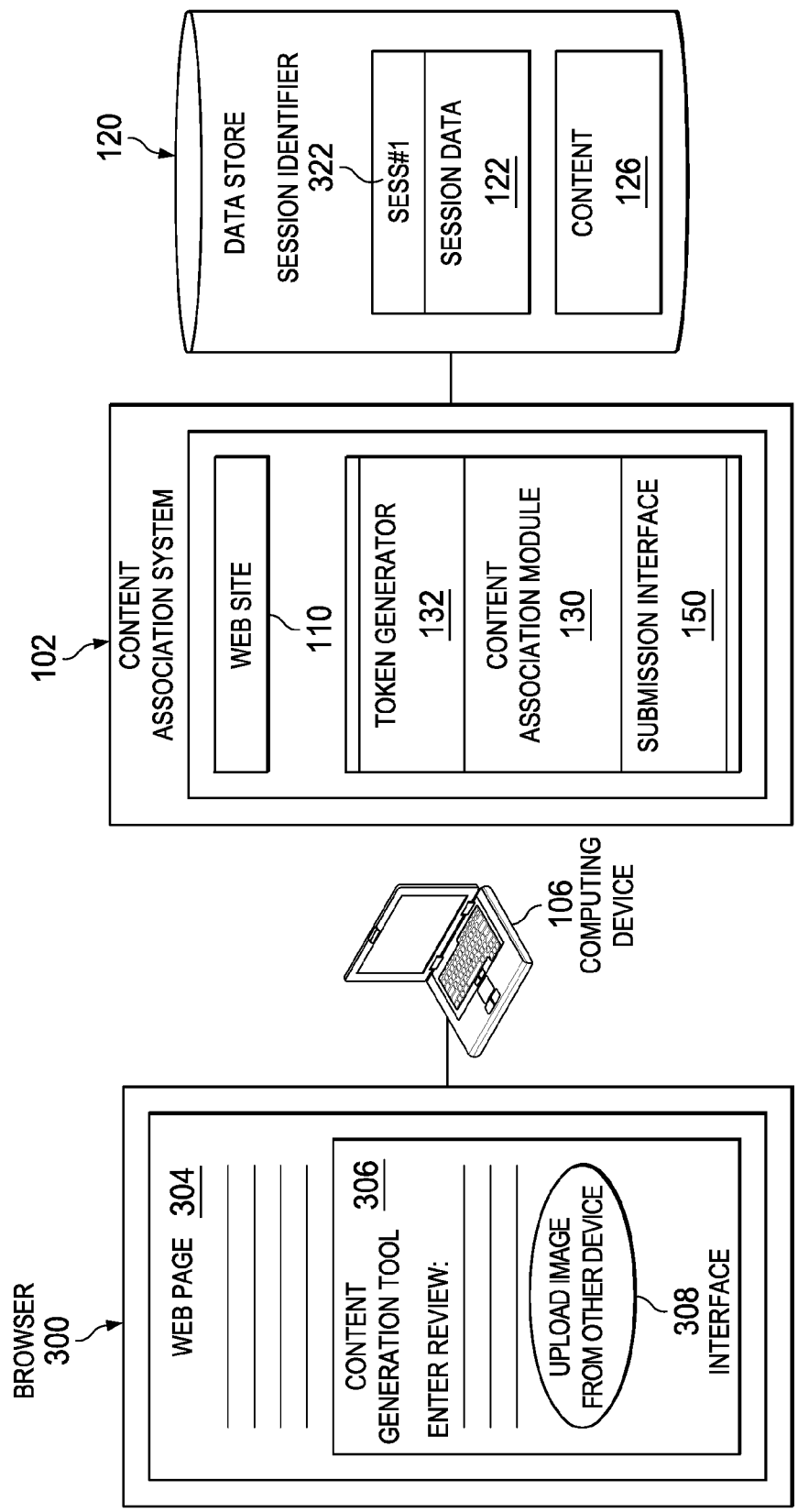

Looking now at FIG. 3B, when the requested web page data 303 is received at computing device 106, the requested web page 304 may be rendered by the browser 300 at the computing device 106 and presented to the user. The web page 304 may provide a content generation tool 306 for use in authoring content such as a review or the like. Such authored content may include, for example, text written by the user, a star rating, or other content. The content generation tool 306 may also include an interface element 308, such as a button, selectable image, or the like, that is selectable to indicate a user's desire to upload an image from a different device for inclusion with the authored content.

Figure 3C:
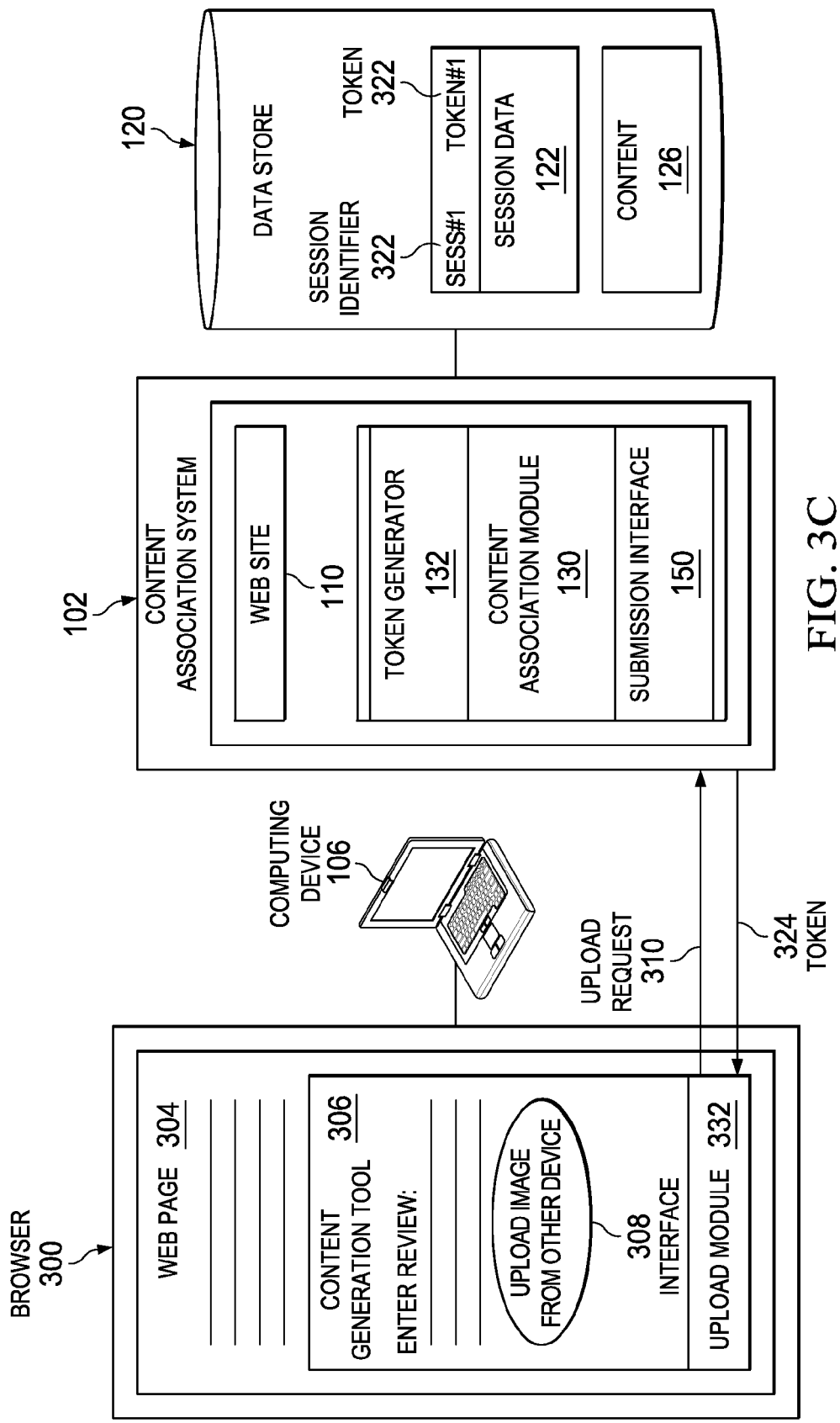

Moving on to FIG. 3C, when the user selects interface element 308, request 310 to upload image content may be sent by upload module 332 of the web page 304 executing in browser 300 to submission interface module 150 at the content association system. Submission interface module 150 may generate a token 324 corresponding to the request. Submission module 150 may store token 324 in and/or identifier 322 (which may associate token 324 to the request and/or to the content-generation session) in session data 122. Submission interface module 150 may also send token 324 to computer device 106 (e.g., via upload module 332).

Figure 3D:
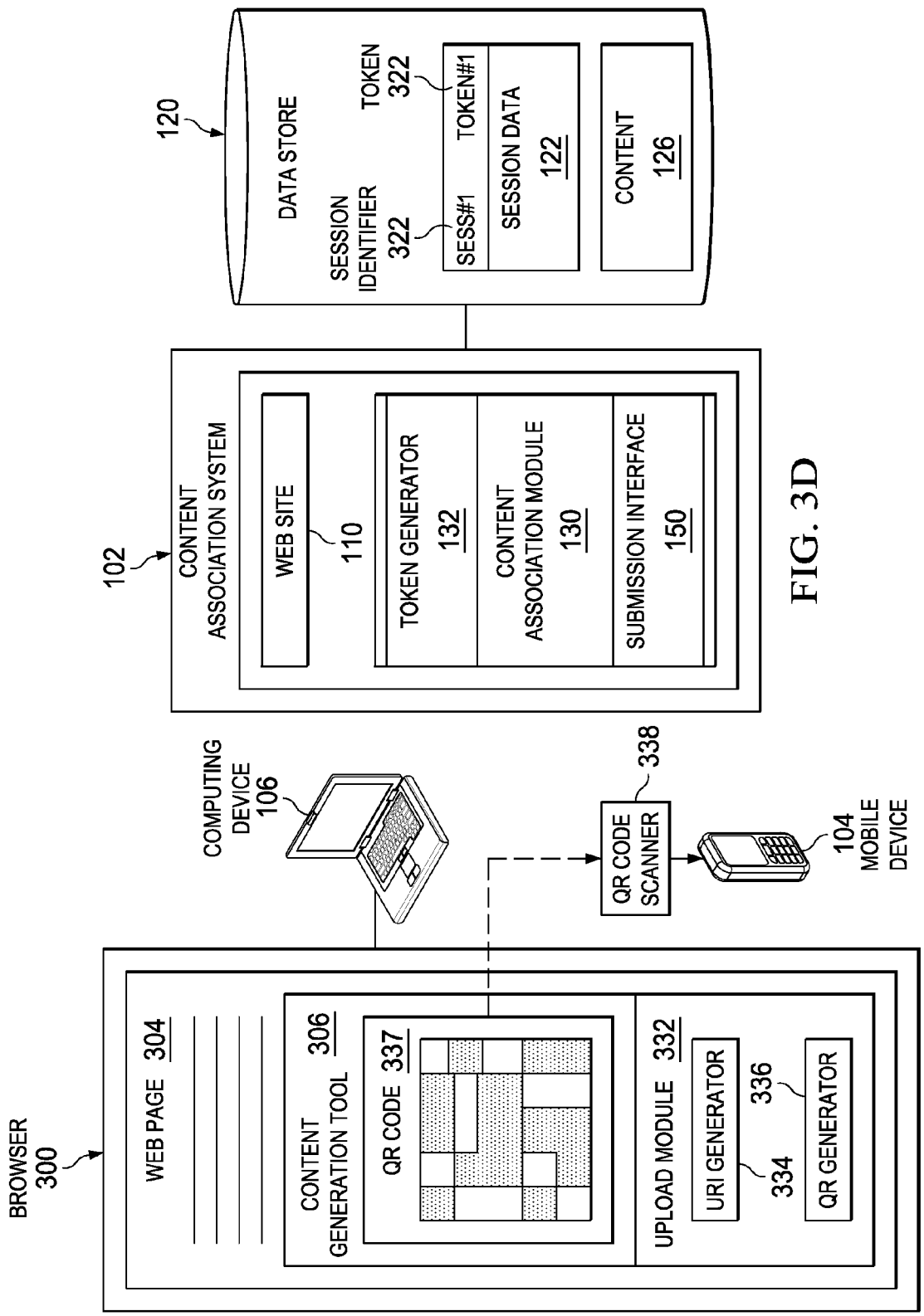

Continuing with FIG. 3D, in some embodiments upload module 332 may include URI generator module 334 and QR code generator module 336. In response to upload module 332 receiving token 324 from the submission interface module 150 (see FIG. 3C), URI generator module 334 may generate a corresponding URI. In some embodiments, QR generator module 336 may generate QR code 337 corresponding to the generated URI, and may present the generated QR code 337 to the user (e.g., through web page 304). Mobile device 104 may include QR code scanner module 338 that may be used to scan the presented QR code 337 (e.g., scanning from a display at computing device 106).

Figure 3E:
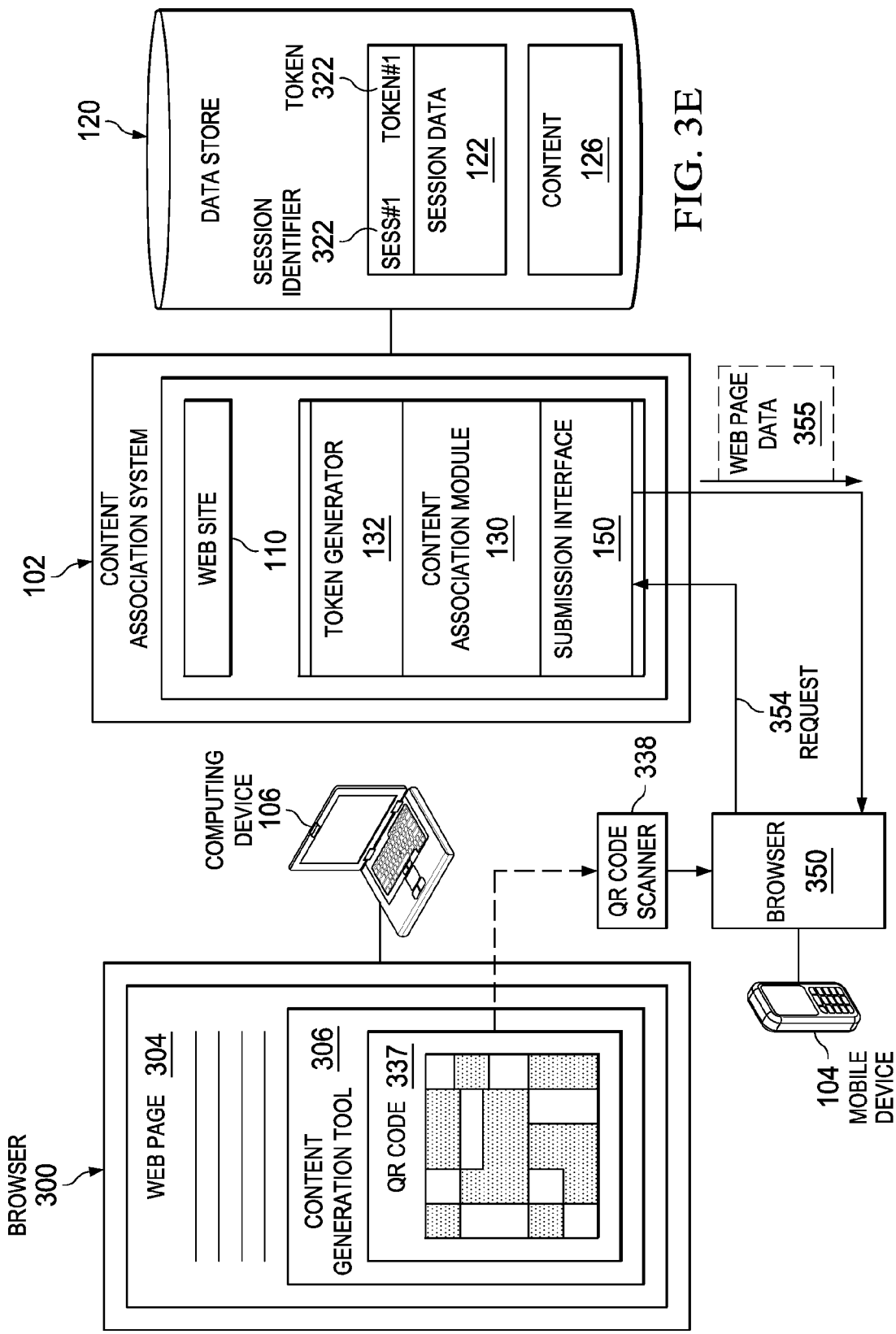

Turning now to the embodiment depicted in FIG. 3E, scanning the QR code 337 may cause browser 350 at mobile device 104 to send a request 354 to access the URI that is encoded in the QR code 337 (e.g., browser 350 may be automatically launched and may be caused to automatically navigate to the resource represented by the encoded URI). Receipt of request 354 may cause the submission interface module 150 to send submission interface web page data 355 to the browser 350 at the mobile device 104.

Figure 3F:
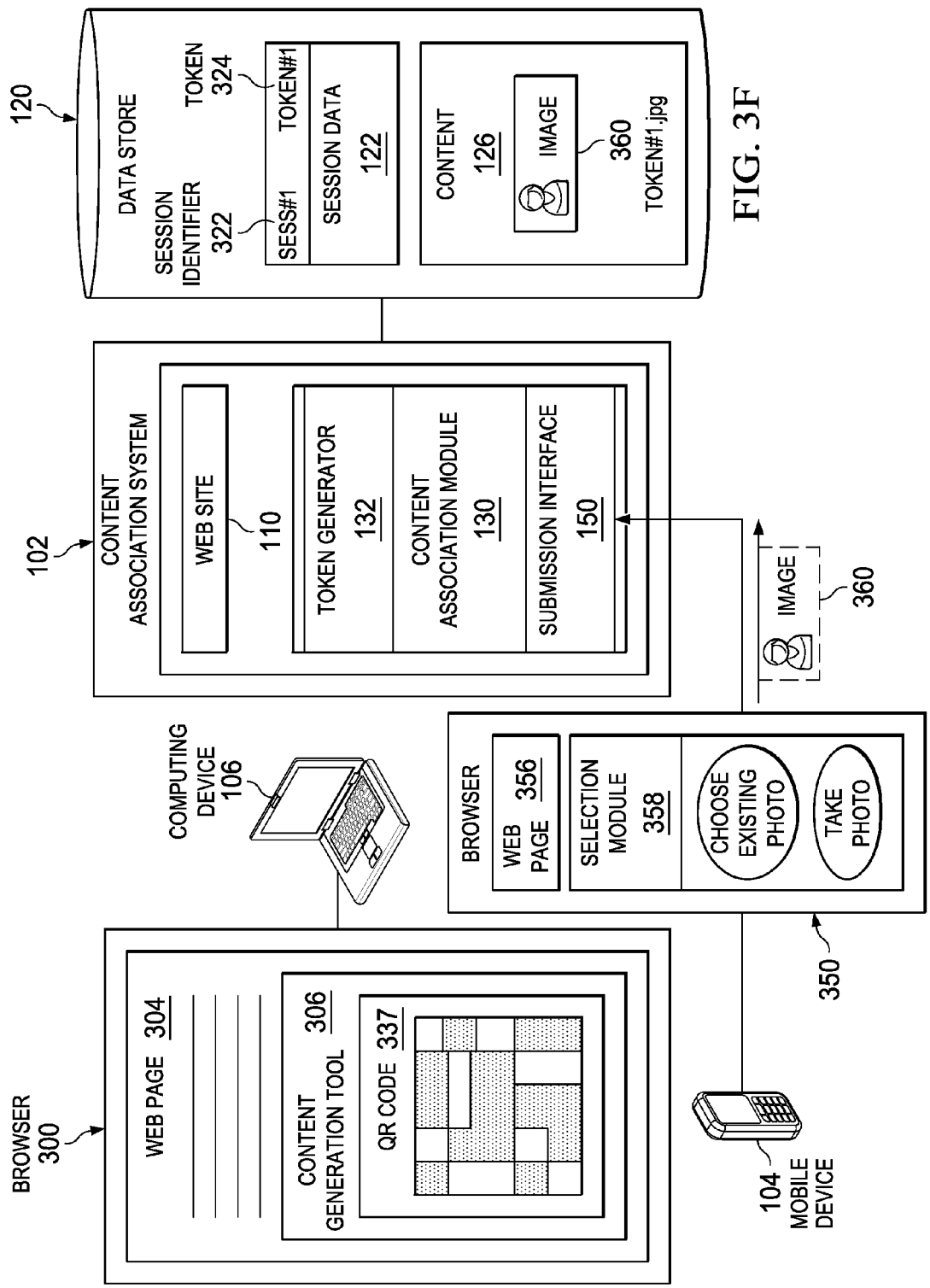

Now looking at the embodiment depicted in FIG. 3F, when the browser 350 at the mobile device 104 renders the submission interface web page 356 based on the received web page data 355, selection module 358 may be provided. Selection module 358 may provide the user with access to functionality on the mobile device 104 (for example, as provided by the mobile device's native operating system) that allows a user to select an image on mobile device 104 (e.g., by selecting a stored image or by using a camera at that mobile device to capture a photo) for submission. Selection module 358 may associate the selected image 360 with the token 324 (for example by naming the selected image based on the token) and may return the image 360 to submission interface module 150 (for example, using a FORM submit or the like).

Once the image 360 is received, submission interface module 150 may save the image 360 as content 126 in data store 120. Additionally, the submission interface module 150 may access session data 122 to determine if there is a session associated with the token 324 corresponding to image 360. In response to determining that session identifier 322 is associated with the token 324, submission interface module 150 may link the image 360 to the session corresponding to session identifier 322.

Figure 3G:
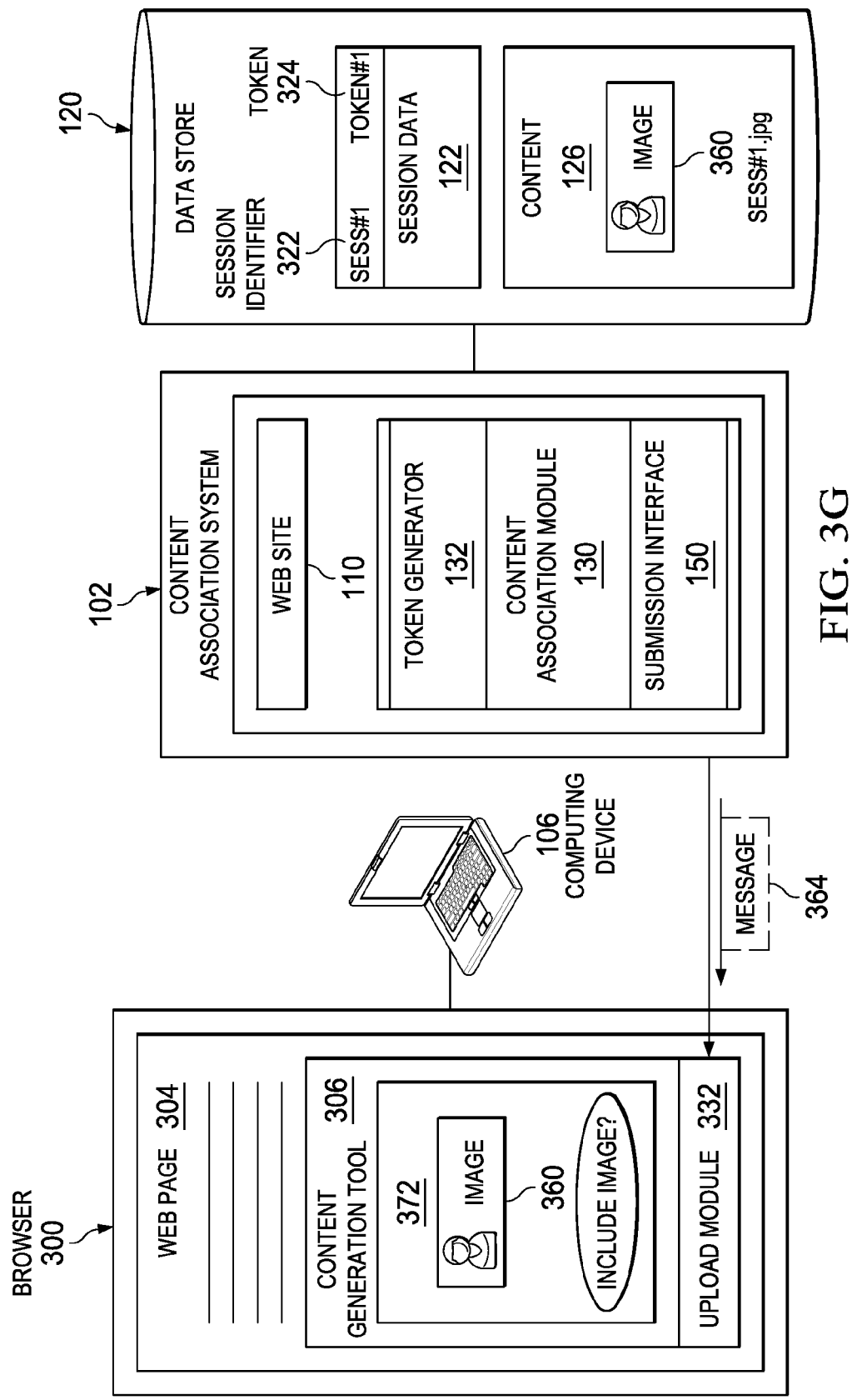

Looking now at the embodiment depicted in FIG. 3G, submission interface module 150 may send message 364 to computing device 106 (e.g., via upload module 332 of the web page 304 that is rendered in browser 300). This message 364 may include instructions that are configured to cause interface 372 to be rendered. The interface 372 may present a number of user-selectable options, such as, for example, accepting image 360 for inclusion with the authored content, accessing image 360 (e.g., for detailed inspection), or editing image 360 (e.g., cropping, centering, rotating). If a user edits image 360 using the interface 372, the modified image may be uploaded to content association system 102.

Figure 3H:
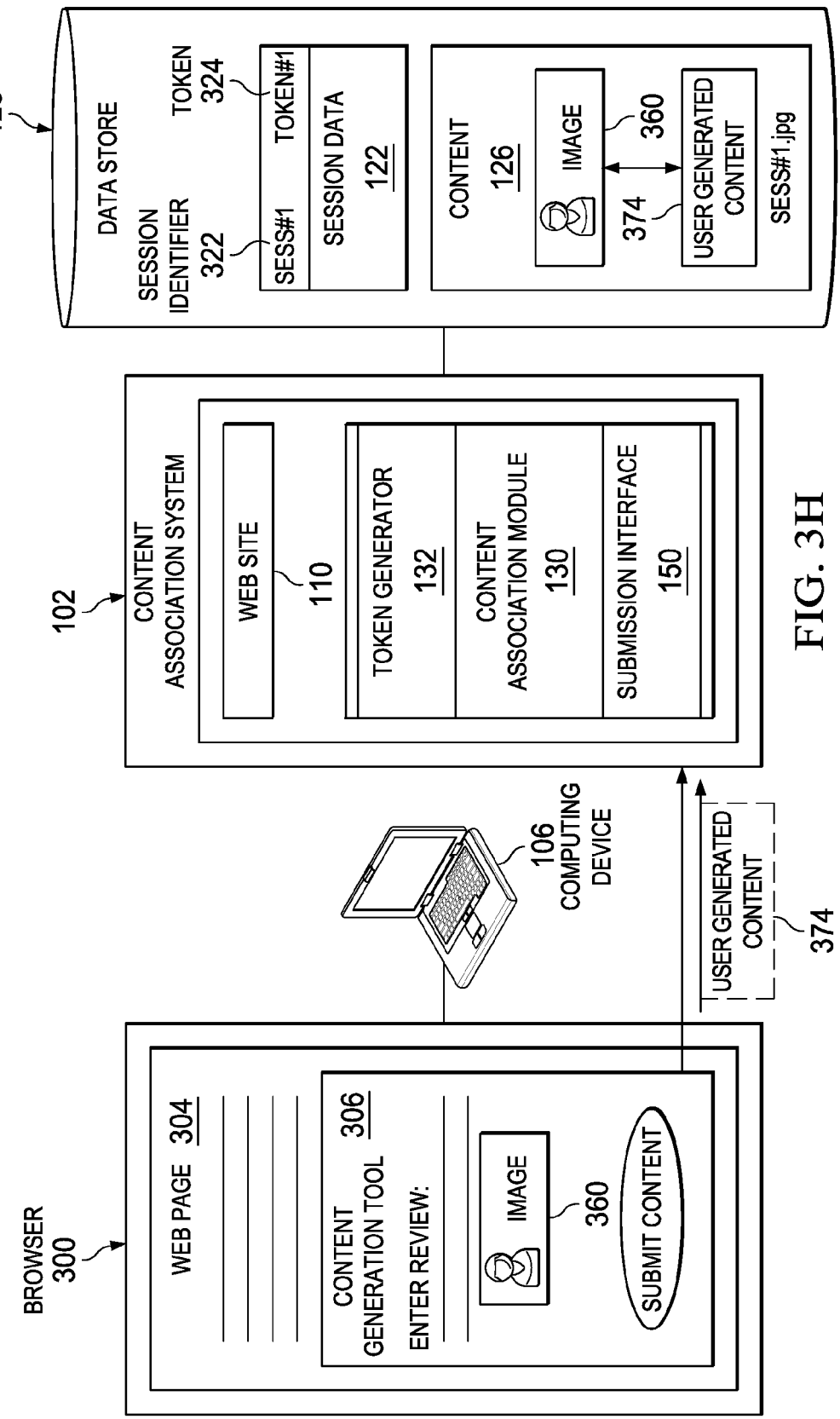

Referring now to FIG. 3H, a user may choose to submit user generated content 374 from computing device 106, which may cause user generated content 374 to be sent from computing device 106 (e.g., via the content generation tool 306 of the web page 304) to the content association system (e.g., via web site module 110). In cases where the user has chosen to include the image 360 in user generated content 374, the user generated content 374 may be associated with the image 360. In some cases, the association may comprise, for example, the inclusion of a URI in the user generated content 374, where the image 360 in data store 120 can be accessed through this URI. Accordingly, if user generated content 374 is subsequently provided in a web page or the like, the image 360 may be included with user generated content 374 as the user generated content 374 is rendered. In some cases, the association may comprise storing the image 360 as part of user generated content 374.

Figure 4:
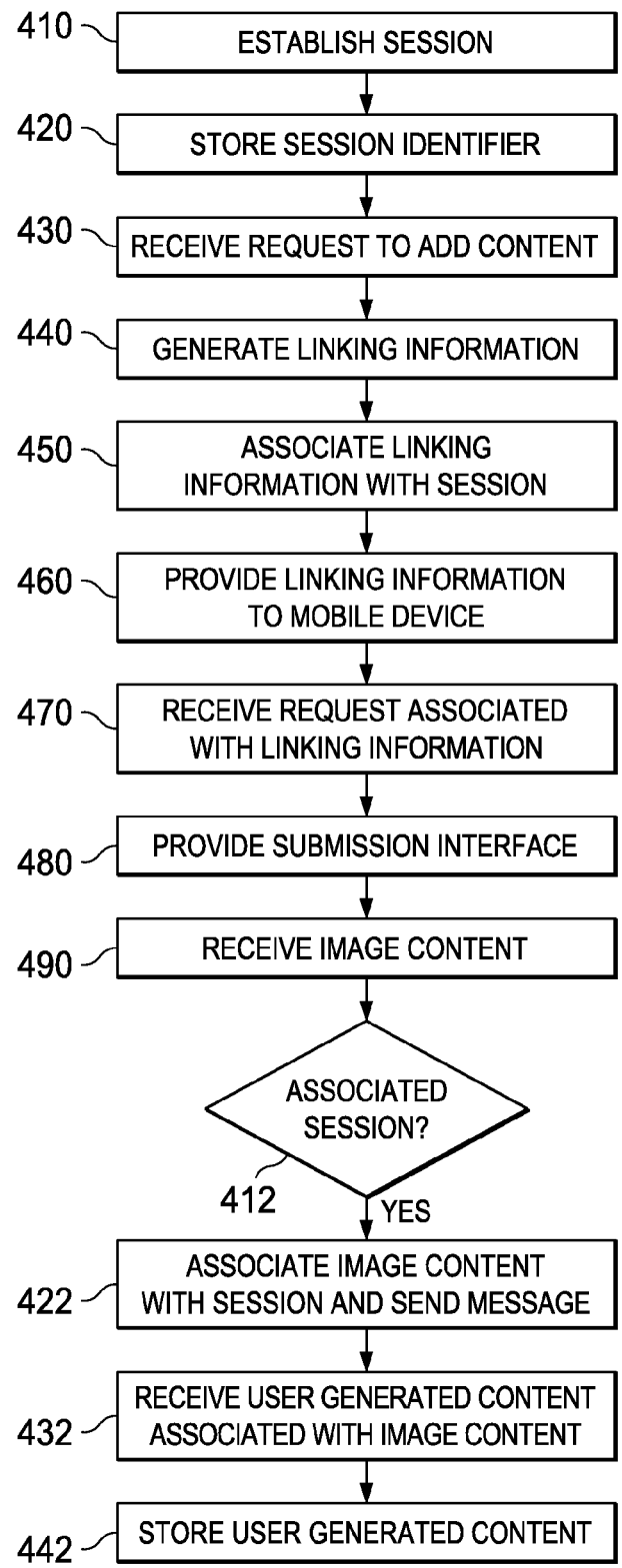
FIG. 4 is a flow diagram of one embodiment of a method for automatically linking content to a session.

Referring now to FIG. 4, one embodiment of a method for content association is depicted. Initially, at step 410 a session may be established. In one embodiment, a web page may be provided to a user at a first computing device (e.g., a desktop computer). The session may be established when the web page is provided to the user, or when the user interacts with the web page. When the session is established, an identifier for the session may be stored at step 420.

In one embodiment, such a session may be established using full-duplex single socket communication techniques, such as those implemented in accordance with the WebSocket specification. Various embodiments may employ other bi-directional communication techniques, such as those provided by Python, Ruby, Java, code libraries such as socket.io or node.js, Asynchronous JavaScript and XML (AJAX), or long polling.

The web page provided may include a content generation tool to allow a user to generate various types of content (e.g., textual content) via a content-generation session. Such a content generation tool may provide an interface that is selectable by a user to associate content from another device with the content being authored by the user using the content generation tool.

At step 430 a request to add content, such as an image, from a second device that is different from the first device may be received. In one embodiment, this request may be initiated by a user that wishes to add content from a mobile device to content that is being authored by the user during a content-generation session conducted at a desktop computer. For example, the content generation tool provided by the web page may include an interface that is selectable by a user to indicate a desire to associate content from the mobile device with the content that is being authored by the user using the content generation tool at the desktop computer.

At step 440, information usable to automatically establish a link to the content-generation session may be generated. This linking information may include a token such as a UUID or other type of character string. This linking information may be generated, for example, based on a Media Access Control (MAC). At step 450 the association between the linking information and the content-generation session may be stored.

This linking information may then be provided to the second device at step 460. To provide the linking information to the second device, in one embodiment, an optical data representation such as a bar code or QR code may be generated. The optical data representation may include a URI generated based on the token. For example, in one particular embodiment, the token may be provided to the first computing device, which may generate a URI based on the received token. In some cases, the first computing device may then generate an optical data representation corresponding to the URI. Such as optical data representation may be displayed (e.g., through a web page displayed at the first computing device). The linking information may be provided to the second device via a code scanner operating on the second device that is configured to read the optical data representation.

In another embodiment, a URI may be generated based on the token and may subsequently be provided to the second device using a message, such as an e-mail or text message, that includes the URI. In such instances, a user may be asked to provide an identifier of the second device (e.g., e-mail address, telephone number) to facilitate sending the message to the second device In yet another embodiment, a URI may be generated and displayed to the user at the first computing device. This URI may be shortened (for example using a URL shortener). Such linking information may in some cases be manually entered at the second device (e.g., typing the URI into a browser on a mobile device).

A request associated with the linking information may be then received at step 470. In one embodiment, a user may scan the optical data representation displayed at the computing device using the second device, as discussed above. For example, a user may scan a QR code displayed at a first computing device (e.g., a desktop computing device) by using a QR code scanner running on a second device (e.g., a mobile device). When the QR code is scanned, a web browser on the mobile device may automatically request the URI included in the QR code. Alternatively, a user may click on an URI provided through an email or text message received at the mobile device, thereby causing the browser on the mobile device to automatically request the URI. Similarly, a user may manually enter the URI into the browser at the mobile device, causing the browser on the mobile device to request the URI.

At step 480, a submission may be provided to the second device (e.g., mobile device) in response to the request for the URI being received. This submission interface may allow the user to select an image on the second device for linking to the session. Once an image has been selected at the second device, it may be associated with the linking information (e.g., using the token), and transmitted from the mobile device.

Image content, which in some cases may include the selected image as well as additional information, can then be received from the second device at step 490. The received image content may be associated with the linking information and stored.

At step 412, it may be determined whether there is a session identifier associated with the linking information. If there is a session associated with the linking information, the image content may be associated with the session. To this end, a message may be sent to the first computing device at step 422. This message may cause the first computer device to display an image processing interface. In some cases, the displayed image processing interface may indicate a URI where the image is stored, or may display the image itself. The image processing interface may also allow a user to select one or more image processing options, including, for example, editing the image and incorporating the image into the content being authored.

The authored content (which in some cases incorporates the image data), may be submitted. The submitted authored content may then be received at step 432, and may be stored at step 442. The stored content may in some cases include references to the image data, or in some cases may include the image data. Accordingly, subsequent rendering of the authored content may include the image data.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

What is claimed is:

1. A method, comprising:
    receiving, at a computer system from a first client device, user generated content associated with a submission of feedback for a product or service, wherein the user generated content includes text;
    the computer system causing a display, on the first client device, of an interface allowing a user of the first client device to submit a request to add image content from a mobile client device to the user generated content;
    receiving, at the computer system from the first client device, the request to add image content from the mobile client device to the user generated content, wherein the mobile client device is distinct from the computer system and the first client device;
    generating, at the computer system, link information usable by the mobile client device to establish a connection corresponding to the user generated content associated with the submission of the feedback on the product or service, wherein the link information includes at least one of a uniform resource identifier (URI) or a quick response (QR) code;
    the computer system providing the link information to the mobile client device, wherein the providing includes at least one of providing an optical data representation to the mobile client device or transmitting the URI to the mobile client device;
    receiving, at the computer system via the connection, particular image content that has been selected from the mobile client device using a content selection interface displayed on the mobile client device; and
    associating, by the computer system, the received particular image content with the user generated content.

2. The method of claim 1, wherein generating the link information includes generating the optical data representation, wherein the optical data representation is configured to cause the mobile client device to automatically establish the connection upon the mobile client device scanning the optical data representation.

3. The method of claim 1, wherein the connection is an Internet connection to the computer system from the mobile client device.

4. The method of claim 1, wherein generating the link information includes generating the URI, wherein the URI is usable at the mobile client device to cause the mobile client device to establish a web connection with the computer system.

5. The method of claim 1, wherein generating the link information includes generating a token.

6. The method of claim 1, wherein the particular image content comprises a video.

7. The method of claim 1, further comprising the computer system causing the link information to be transmitted to the mobile client device via text message sent over a mobile data network.

8. The method of claim 1, wherein the mobile client device is a laptop computer.

9. The method of claim 1, further comprising the computer system associating the received user generated content and the received particular image content with a web page including a plurality of user reviews for the product or service.

10. An article of manufacture including a non-transitory computer-readable medium having stored thereon instructions, wherein the instructions are executable by a computer system to cause the computer system to perform operations comprising:

receiving, from a first client device, user generated content associated with a submission of feedback for a product or service, wherein the user generated content includes text-based content;

causing a display, on the first client device, of an interface configured to allow a user of the first client device to submit a request to add image content from a mobile client device to the user generated content;

receiving, from the first client device, the request to add image content from the mobile client device to the user generated content, wherein the mobile client device is distinct from the first client device and the computer system;

generating information usable by the mobile client device to establish an Internet connection to a media submission interface of the computer system, wherein the generated information includes at least one of a uniform resource identifier (URI) or an optical data representation;

providing the generated information to the mobile client device, wherein the providing includes at least one of providing the optical data representation to the mobile client device or transmitting the URI to the mobile client device;

receiving particular media content that has been selected from the mobile client device using a content selection interface displayed on the mobile client device, wherein the particular media content includes image content; and associating the received particular media content with the user generated content.

11. The article of manufacture of claim 10, wherein generating the information includes generating the optical data representation, wherein the optical data representation is configured to cause the mobile client device to automatically establish the Internet connection upon scanning of the optical data representation by the mobile client device.

12. The article of manufacture of claim 11, wherein the optical data representation is a Quick Recognition (QR) code.

13. The article of manufacture of claim 10, wherein generating the information includes generating an identifier that uniquely corresponds to the user generated content, and wherein the user generated content includes a rating of the product or service.

14. The article of manufacture of claim 10, wherein receiving the particular media content includes receiving audio content.

15. A computer system, comprising:

one or more processors;

memory, coupled to the one more processors, having program instructions stored thereon that are executable to cause the computer system to perform operations comprising:

receiving, from a first client device, user generated content associated with a submission of feedback for a product or service, wherein the user generated content includes text;

causing a display, on the first client device, of an interface allowing a user of the first client device to submit a request to add image content from a mobile client device to the user generated content;

receiving, from the first client device, the request to add image content from the mobile client device to the user generated content, wherein the mobile client device is distinct from the computer system and the first client device;

generating link information usable by the mobile client device to establish a connection corresponding to the user generated content associated with the submission of the feedback on the product or service, wherein the link information includes at least one of a uniform resource identifier (URI) or a quick response (QR) code;

providing the link information to the mobile client device, wherein the providing includes at least one of providing an optical data representation to the mobile client device or transmitting the URI to the mobile client device;

receiving, via the connection, particular media content that has been selected from the mobile client device using a content selection interface displayed on the mobile client device, wherein the particular media content includes image content; and associating the received particular media content with the user generated content.

16. The system of claim 15, wherein the operations further comprise: causing a prompt to select image content stored at the mobile client device to be presented to an author of the user generated content.

17. The system of claim 15, wherein the operations further comprise causing the received particular media content to be displayed on a web page associated with the product or service along with the text included in the user generated content.

* * * * *